April 30, 1929.   J. D. LANGDON   1,711,235

FLUID MEASURING VALVE

Filed April 4, 1927

Inventor
Jesse D. Langdon
By Monroe E. Miller
Attorney

Patented Apr. 30, 1929.

1,711,235

UNITED STATES PATENT OFFICE.

JESSE D. LANGDON, OF LOS ANGELES, CALIFORNIA, ASSIGNOR TO LANGDON ENGINEERING CORPORATION, OF LOS ANGELES, CALIFORNIA.

FLUID-MEASURING VALVE.

Application filed April 4, 1927. Serial No. 180,893.

The present invention relates to valves, and aims to provide a novel and improved measuring valve for water or other fluid, which may be used for permitting a predetermined flow of the fluid or which may be use as a flush valve.

Another object of the invention is to provide a novel valve member for shutting off the flow of fluid.

A further object is the provision of novel relief valve means cooperable with the valve member.

It is also an object of the invention to provide a valve of the kind indicated wherein the casing and fixed members therein may be composed chiefly of sheet metal stampings, and wherein provision for adjustment is made to regulate the flow of fluid.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
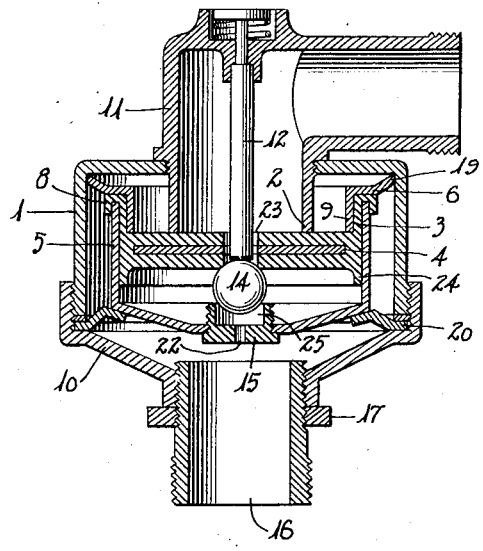
Figure 1 is a median section of the valve, portions being shown in elevation.
Figures 2, 3:
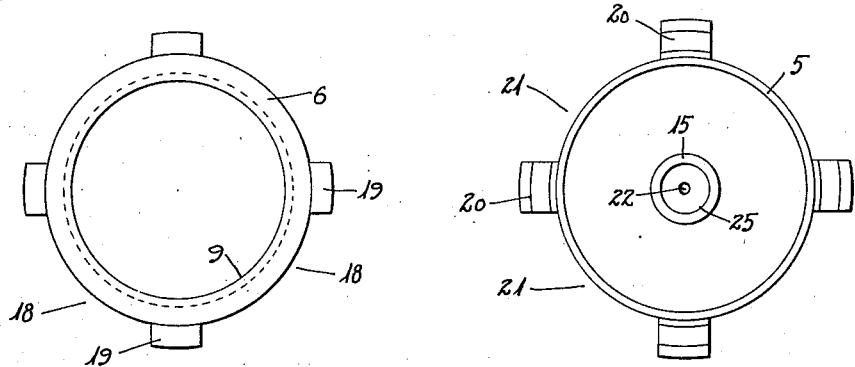
Fig. 2 is a plan view of the spider for holding the cup-shaped member.
Fig. 3 is a plan view of the cylinder.

The casing 1 is cylindrical, with an integral top, and a screw cap 10 forms the bottom of the casing. The body of the casing and screw cap may each be stamped from metal, and the cap is preferably of funnel shape, with its rim screw-threaded on the rim of the body.

An elbow 11 has one arm screw-threaded or otherwise engaged through the top of the casing and its inner terminal provides a valve seat 2. Said elbow constitutes the outlet of the casing, and a nipple 16 is screw-threaded through the spout portion or boss of the cap 10 and constitutes the inlet of the casing. A lock nut 17 is threaded on the nipple 16 to maintain the adjustment thereof.

A cup-shaped member 3 of rubber or other elastic material constitutes the valve member for closing the valve. The closed end or bottom of the member 3 is preferably thick and has a reinforcing disk 4 embedded therein. The inner surface of the closed end or bottom of the member 3 constitutes a valve portion to seat against the seat 2, so that the valve seat is located or extends within the member 3.

In order to hold the member 3 in place within the casing, a ring 6 forms a seat for the rim of the member 3, and has lugs 19 extending angularly from the outer edge to seat against the top of the casing, so as to space said ring from the top of the casing, and provide passages 18 through which the fluid may flow. The ring 6 thus constitutes a spider seatable against the top of the casing and against which the rim of the member 3 may be clamped. The ring or spider 6 has an annular flange 9 at its inner edge extending within the member 3 and overlapping the wall thereof, around the seat 2.

The member 3 is disposed within a cylinder 5, and the closed end or bottom of the member 3 provides a piston working snugly in said cylinder. The rim of the member 3 has a grooved flange 8 receiving the upper edge of the cylinder, so that the rim or flange of the member 3 is clamped between the ring or spider 6 and the cylinder.

The cylinder 5 is cup-shaped and its bottom is preferably of inverted cone shape, and by adjusting the nipple 16 closer to or farther from the bottom or closed end of the cylinder 5, the flow of fluid through the casing may be regulated.

The cylinder 5 has the lugs or arms 20 to seat against the cap 10, so as to be clamped between said cap and the body of the casing, thereby securely fixing the cylinder 5 within the casing, and there are passages 21 between the arms 20 to permit the fluid to flow between the cylinder and wall of the casing. The arms 20 provide a spider for supporting the cylinder in place, and the cylinder may be a metal stamping. It is apparent that when the cap 10 is unscrewed from the casing body, the parts may be readily separated and assembled. The valve seat 2, spider 6, member 3, and cylinder 5 are all concentric within the casing.

Between the member 3 and bottom of the cylinder is a fluid chamber, and a plug 15 is screw-threaded through the bottom of the cylinder and has a central aperture 22 providing a restricted fluid inlet for said chamber, communicating with the casing inlet, for the flow of fluid into said chamber. The closed end or piston of the member 3 has a central relief opening 23, forming an outlet for the chamber, communicating with the casing outlet, and a ball 14 providing a relief valve, is seatable upwardly against the member 3 across the opening 23, so as to close the opening. The plug 15 has a recess 25 to receive the ball 14 when it is unseated downwardly, and the ball 14 seating in the recess of the plug 15 will close the inlet of the chamber. The member 3 is provided at its closed end or piston with an annular lip 24 extending away from the rim of said member and bearing against the wall of the cylinder 5. Said lip is forced against the cylinder wall by the pressure of fluid in the chamber, to prevent the fluid passing between the member 3 and cylinder. The stretching of the wall of the member 3 also has a tendency to spring the lip 24 against the cylinder wall.

A spring-retracted plunger 12 is slidable in the elbow 11 and projects into the opening 23 to contact with the ball 14 when the outer end or button of the plunger 12 is pressed down.

The valve is closed by the contraction of the rim or wall of the member 3, which pulls or draws the closed end or valve portion of said member against the seat 2. The seat 2 is spaced from the flange 9 and rim of the member 3 so that the fluid flowing upwardly between the cylinder and casing wall passes over the spider 6 and exerts pressure against the member 3 surrounding the valve seat 2, but the pressure of fluid within the cylinder chamber against the member 3 is greater so as to hold said member seated. Fluid enters the cylinder chamber through the plug 15 and holds the ball 14 seated across the opening 23.

When the plunger 12 is depressed the ball 14 is unseated downwardly, thereby relieving the pressure in the cylinder chamber, so that the fluid may flow through the opening 23 to the casing outlet, and, at the same time, the ball 14 is seated in the plug 15. Therefore, the fluid pressure acting against the member 3 will move the closed end or piston of said member downwardly, to open the valve and establish the flow, the fluid passing from the inlet between the cylinder and casing, over the spider 6 into the member 3 and thence upwardly through the casing outlet. If the plunger 12 is held down, it holds the ball 14 seated in the plug 15, so as to prevent the fluid entering the cylinder chamber, and the valve will remain open. The plug 15 may be unscrewed for purpose of adjustment to regulate the downward limit of movement of the ball 14 and member 3. When the plunger 12 is released, it releases the ball 14, and the fluid acting under pressure through the plug 15 will immediately force the ball 14 upwardly against the member 3 across the opening 23, thereby shutting off the discharge of fluid from the cylinder chamber, and the fluid entering said chamber will force the piston upwardly, the pressure within the cylinder chamber upwardly against the piston being greater than the pressure of the fluid acting downwardly against the piston from within the member 3. Thus, the upward pressure of fluid against the member 3, assisted by the contraction of the rim or wall of the member 3, will seat the valve portion and close the valve. The time interval is determined by the adjustment of the nipple 16 which regulates the flow of fluid and the size of the aperture 22 in the plug 15 which controls the admission of fluid into the cylinder chamber. If, during each operation, the plunger 12 is immediately released after being depressed, or is released after a predetermined time interval after being depressed, the amount of water flowing through the valve will be uniform, so that the valve may be used for measuring the fluid, although the device is useful as a flush valve.

When the ball 14 is unseated and moved against the plug 15 by the plunger 12, the member 3 being moved downwardly will be limited in its movement by seating against the ball 14, so that said ball is seated against the member 3 in both the closed and open positions of the valve. Therefore, as soon as the plunger 12 is released the ball 14 is already seated against the member 3 and said ball and member will move upwardly without separating. The stretching action of the member 3 will eliminate the use of a spring in the valve, and the contraction of said member will seat it.

Having thus described the invention, what is claimed as new is:—

1. A valve comprising a casing having an inlet and an outlet, a cylinder within the casing, a cup-shaped elastic member mounted in said casing and having its closed end movable as a piston in said cylinder, and a valve seat within the casing entering said member and against which the closed end of said member is seatable by the contraction of the wall of said member.

2. A valve comprising a casing, a cylinder and a spider seated against opposite portions of the casing, a cup-shaped member of elastic material having its rim clamped between said cylinder and spider, the closed end of said member being movable as a piston in said cylinder, and a valve seat within the casing entering said member in order that the closed end of said member will seat thereagainst by the contraction of the wall of said member.

3. A valve comprising a casing having a removable cap, a cylinder and a spider within the casing clamped between said cap and the opposite portion of the casing, said cylinder and spider being spaced from the casing for the flow of fluid between said casing and the cylinder and spider, a cup-shaped member of elastic material having its rim clamped between said cylinder and spider, the closed end of said member being movable as a piston in said cylinder, and a valve seat within the casing entering said member in order that the closed end of said member will seat thereagainst by the contraction of the wall of said member.

4. A valve comprising a casing having separable parts, a cylinder within the casing, spiders at the opposite ends of the cylinder seating against said parts of the casing to hold the cylinder in place, the casing having an inlet and an outlet at the opposite ends of the cylinder, and a valve member working in said cylinder, the casing having a valve seat against which said valve member is seatable.

5. A valve comprising a casing having an inlet and an outlet, a valve seat in the casing between said inlet and outlet, a chamber in the casing having an inlet communicating with the casing inlet, a valve member between said valve seat and chamber movable to and from said seat and having an opening communicating with the casing outlet, a relief valve member between and alternately seatable across said opening and chamber inlet, and means for moving said relief valve member from said opening to said chamber inlet.

6. A valve comprising a casing having an inlet and an outlet, a valve seat in the casing between said inlet and outlet, a chamber in the casing having an inlet communicating with the casing inlet, a valve member between said valve seat and chamber movable to and from said seat and having an opening communicating with the casing outlet, a relief valve member between and alternately seatable across said opening and chamber inlet, and means for moving said relief valve member from said opening to said chamber inlet, said relief valve member serving as a stop to limit the movement of the first named valve member away from the valve seat.

7. A valve comprising a casing having an inlet and an outlet, a valve seat between said inlet and outlet, a chamber within the casing including a plug having an inlet for the chamber and a recess, a valve member movable between said valve seat and chamber to and from the valve seat and having an opening communicating with the casing outlet, a ball between said opening and plug seatable across said opening and in said recess, and means for moving said ball from said opening into said recess.

8. A valve comprising a casing having an outlet, an inlet member for said casing, a valve seat in the casing between said inlet member and outlet, a chamber within the casing having an inlet communicating with said inlet member, said inlet member being adjustable to and from the chamber, a valve member movable between said chamber and valve seat to and from said seat and having an opening communicating with the casing outlet, and a relief valve member for said opening.

9. A valve having a valve member of rubber or similar elastic material including a substantially rigid valve portion movable along a line to and from a valve seat and an elastic portion adapted to stretch along a line parallel to the line of movement of the valve portion and to seat said valve portion by the contraction of the last-named portion.

10. A valve member of rubber or similar elastic material having a substantially rigid valve portion adapted to move as a piston within a cylinder and having a portion to extend from said valve portion and adapted to stretch along a line parallel to the line of movement of said valve portion and to seat said valve portion by the contraction of the lastnamed portion.

11. A cup-shaped valve member of rubber or similar material whose wall is adapted to fit within a cylinder and to stretch longitudinally, said valve member having a valve portion at the inner side of its closed end to move against a valve seat by the contraction of the wall of said member.

12. A valve comprising a casing having an inlet and an outlet, a cylinder within the casing, a cup-shaped elastic member mounted in said casing and having its closed end movable as a piston in said cylinder, and a valve seat within the casing, the closed end of said member having a valve portion to seat against said seat by the contraction of the wall of said member.

13. A valve comprising a casing having an inlet and an outlet and a valve seat between said inlet and outlet, and a valve member mounted in said casing and composed of rubber or similar material, said valve member having a substantially rigid valve portion to bear against said seat and having an elastic portion arranged substantially parallel to the line of movement of said valve portion to and from said seat and adapted to stretch parallel to said line to move said valve portion against said seat by the contraction of the lastnamed portion.

In testimony whereof I have signed my name to this specification.

JESSE D. LANGDON.